(12) United States Patent
Arnold et al.

(10) Patent No.: US 6,847,858 B2
(45) Date of Patent: Jan. 25, 2005

(54) SYSTEM AND METHOD FOR MANAGING RELEASE OF GOODS FOR PACKAGING

(75) Inventors: Patricia F. Arnold, Austin, TX (US); Kymn R. Cardosa, Austin, TX (US); Matt Diamond, Austin, TX (US)

(73) Assignee: Dell Products L.P., Round Rock, TX (US)

(*) Notice: Subject to any disclaimer, the term of this patent is extended or adjusted under 35 U.S.C. 154(b) by 418 days.

(21) Appl. No.: 10/005,505

(22) Filed: Dec. 5, 2001

(65) Prior Publication Data

US 2003/0105542 A1 Jun. 5, 2003

(51) Int. Cl.[7] .............................................. G06F 17/00
(52) U.S. Cl. ....................................... 700/216; 700/102
(58) Field of Search ............................ 700/100, 101, 700/102, 108, 109, 112, 115, 216, 217; 717/102; 705/7, 26, 56

(56) References Cited

U.S. PATENT DOCUMENTS

| | | | |
|---|---|---|---|
| 4,544,318 A | 10/1985 | Nagatomo et al. | 196/230 |
| 4,887,218 A | 12/1989 | Natarajan | 700/102 |
| 5,434,792 A | 7/1995 | Saka et al. | 700/110 |
| 5,630,070 A | 5/1997 | Dietrich et al. | 705/8 |
| 6,088,626 A | 7/2000 | Lilly et al. | 700/100 |
| 6,505,094 B2 * | 1/2003 | Pape et al. | 700/217 |
| 6,529,797 B2 * | 3/2003 | Williams et al. | 700/216 |
| 6,560,509 B2 * | 5/2003 | Williams et al. | 700/216 |
| 6,631,606 B2 * | 10/2003 | Lawton et al. | 53/473 |
| 2002/0123918 A1 * | 9/2002 | Brown et al. | 705/7 |
| 2002/0156694 A1 * | 10/2002 | Christensen et al. | 705/26 |
| 2002/0188519 A1 * | 12/2002 | Anderson | 705/26 |

* cited by examiner

Primary Examiner—Leo Picard
Assistant Examiner—Chad Rapp
(74) Attorney, Agent, or Firm—Baker Botts L.L.P.

(57) ABSTRACT

A factory for manufacturing customized products in response to customer orders includes pre-packaging facilities and packaging facilities. Components are converted into completed products in the pre-packaging facilities, and the completed products are packaged in the packaging facilities. The factory also includes an order management system that associates individually identified products among the completed products with a customer order. Product release logic in the order management system accumulates the individually identified products in the pre-packaging facilities. The product release logic releases the individually identified products for transport from the pre-packaging facilities to the packaging facilities only after determining that substantially all of the individually identified products for the customer order have been completed.

21 Claims, 4 Drawing Sheets

| Unit Identifier | Unit Location |
|---|---|
| 8WVL501 | SV24B081 |
| 4X7L501 | SV26A122 |
| CFJK501 | SV26A103 |
| D8ML501 | SV26A034 |

02-Nov-2002   08:28:07
00001163

SYSTEM AND METHOD FOR MANAGING RELEASE OF GOODS FOR PACKAGING

TECHNICAL FIELD

The present disclosure relates in general to methods and systems for manufacturing goods and, in particular, to facilities and methods for manufacturing products such as computer systems according to customer orders. Specifically, this disclosure relates systems, methods, and software programs for managing the release of goods for transport to a packaging or shipping facility after the goods have been assembled or tested.

BACKGROUND

Many years ago, manufacturers learned that assembly lines can often be used to increase production rates and decrease per-unit production costs. Assembly lines are typically used in a build-to-stock production model, where large quantities of identical products are manufactured in anticipation of forecasted demand.

In many markets, however, predicting customer demand is risky, at best. For example, in the market for computer systems and related items, technological improvements are realized so frequently and component prices change so rapidly that it is difficult to accurately predict how large the market for any particular product will ultimately be. As a result, when manufacturers in industries like information technology utilize the build-to-stock model, those manufacturers frequently find themselves with stocks of manufactured goods that are difficult or impossible to market at a profit.

A contrasting model of production that helps manufacturers avoid the stale-inventory problem is the build-to-order model. According to that model, each product is assembled only after receiving a customer order for that product. In response to receiving the customer order, the manufacturer builds the product according to the order.

For purposes of this document, a product that is manufactured "according to" a customer order is a product that is (1) manufactured in response to a specific order from a customer and (2) manufactured to have the features specified in that order. With regard to shipping, items that are shipped "according to" a customer order are items that are shipped in such a manner that all of the items arrive at the location specified in the order within the time specified in the order.

Build-to-order manufacturing systems may be used to give customers more options with regard to product configuration and to address the stale inventory problem. However, build-to-order manufacturing systems have generally been less efficient than build-to-stock manufacturing systems, with regard to the amount of time and labor required to fill orders. Production costs are therefore typically greater in build-to-order manufacturing systems. In addition, in both types of manufacturing systems, production costs are affected by the space requirements.

In highly competitive markets, any significant reduction in production costs that does not adversely affect product quality can be an important improvement. As recognized by the present disclosure, a need therefore exists for a way to reduce space, time, and/or labor requirements in build-to-order manufacturing facilities.

SUMMARY

The present disclosure relates to a system, a method, and software for managing the release of assembled products for transport to packaging facilities of a factory. In an example embodiment, the products are individually identified products which are manufactured in response to customer orders in a factory that includes pre-packaging facilities and packaging facilities. Components are converted into completed products in the pre-packaging facilities, and the completed products are packaged in the packaging facilities. For example, the pre-packaging facilities may include assembling facilities and testing facilities.

An order management system associates substantially each individually identified product with a customer order. Product release logic in the order management system accumulates the individually identified products in the pre-packaging facilities. The product release logic releases the individually identified products for transport from the pre-packaging facilities to the packaging facilities only after determining that substantially all of the individually identified products for a customer order have been completed.

When the products are released, one or more pick reports may be produced to identify the products to be released from the pre-packaging facilities. Personnel may then retrieve the products for transport to the packaging facilities, based on the pick reports. Additional functionality, such as product location reports, productivity reports, means for preventing products from being released, etc., may also be provided.

BRIEF DESCRIPTION OF THE DRAWINGS

The present disclosure and its numerous objects, features, and advantages may be better understood by reference to the following description of an example embodiment and the accompanying drawings, in which.

DETAILED DESCRIPTION

Figure 1:
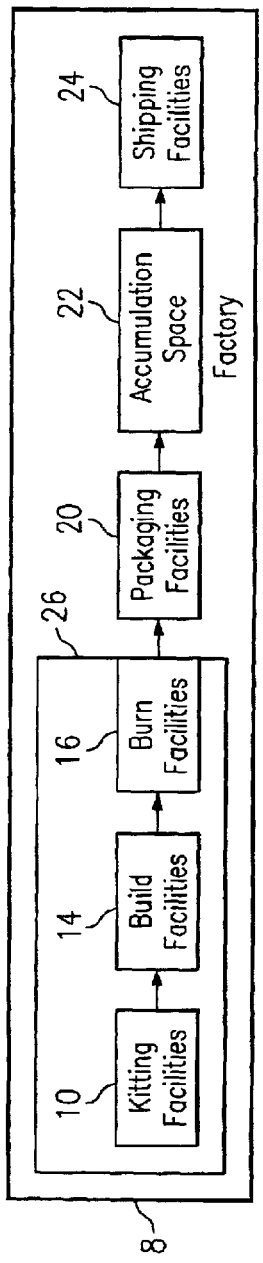
FIG. 1 presents a block diagram of a prior factory for producing products such as computer systems in a build-to-order fashion.

FIG. 1 depicts a prior art factory 8 for building products according to customer orders. This particular factory 8 is designed to produce customized computer systems, where each computer features the specific hardware components that a customer has specified in a customer order. For example, the computers may be assembled from components such as various types of motherboards, central processing units (CPUs), video cards, network cards, hard disk drives, floppy disk drives, CD-ROM drives, memory, chassis, etc.

Factory 8 includes kitting facilities 10, and when a customer order is released for production, the hardware components required for the computer systems in the customer order are collected together to form respective kits. Each kit of components is transported to build facilities 14, where the components are assembled to form a computer system. The computer system is then transported to burn facilities 16, where software is loaded onto the system and various system tests are performed. Many computers may undergo testing concurrently in burn facilities 16, and workers in burn facilities 16 monitor the systems under test for test completion. If a computer does not pass the tests (i.e., does not test good), the worker may transport the computer to an electromechanical repair (EMR) station for repairs. After repair, the computer may be returned to burn facilities 16 to be re-tested. When a worker detects that a computer has passed testing, the worker retrieves the system from burn facilities 16 and transports the system to packaging facilities 20, where the system is boxed.

For the purposes of this document, a product is considered completed once it is ready to be packaged. For example, in factory 8, once a computer has been assembled, repaired if necessary, and tested good, the computer is considered completed. By contrast, an order is considered completed once all products required for that order have been completed. Also, kitting facilities 10, build facilities 14, and burn facilities 16 may be referred to collectively as pre-packaging facilities 26.

Factory 8 also includes accumulation space 22, which is used to store boxed systems for incomplete orders. Specifically, customer orders frequently call for multiple computer systems, and all of the systems typically are not completed simultaneously. For example, if a customer order includes ninety computers, some of the computers may have been completed, boxed, and transported to accumulation space 22, while others may still be in burn facilities 16, build facilities 14, kitting facilities 12, the EMR station, or not even kitted yet. Accumulation space 22 is used to store the systems that have been completed and packaged while the remaining systems are still in process.

Furthermore, factory 8 may be working concurrently on numerous different orders for numerous different customers, with each order calling for numerous computer systems. In such a case, one or more pallets for each order will be placed in accumulation space 22, to hold the packaged systems coming from packaging facilities 20 while the remaining systems for each order are being completed and boxed. Accumulation space 22 therefore consumes a substantial amount of space in factory 8.

Once all of the computers for a customer order have been boxed and transported to accumulation space 22, the pallets with those computers are then moved from accumulation space 22 to shipping facilities 24, to be shipped in a group to a remote destination, such as a customer site. The customer order may also include associated articles, such as speakers, printers, docking stations for portable computers (e.g., advanced port replicators (APRs)), monitors, etc., and those articles may also be shipped from the factory with the computers.

Thus, in factory 8, orders are released for production to kitting facilities 10, and assembled products are transported from build facilities 14 to burn facilities 16 as each system is assembled. Completed products are then transported from burn facilities 16 to packaging facilities 20 as each system is completed, and packaged products are transported from packaging facilities 20 to accumulation space 22 as each product is packaged. Once all of the packaged products for an order have been moved to accumulation space 22, those packaged products are then transported as a group from accumulation space 22 to shipping facilities 24.

Figure 2:
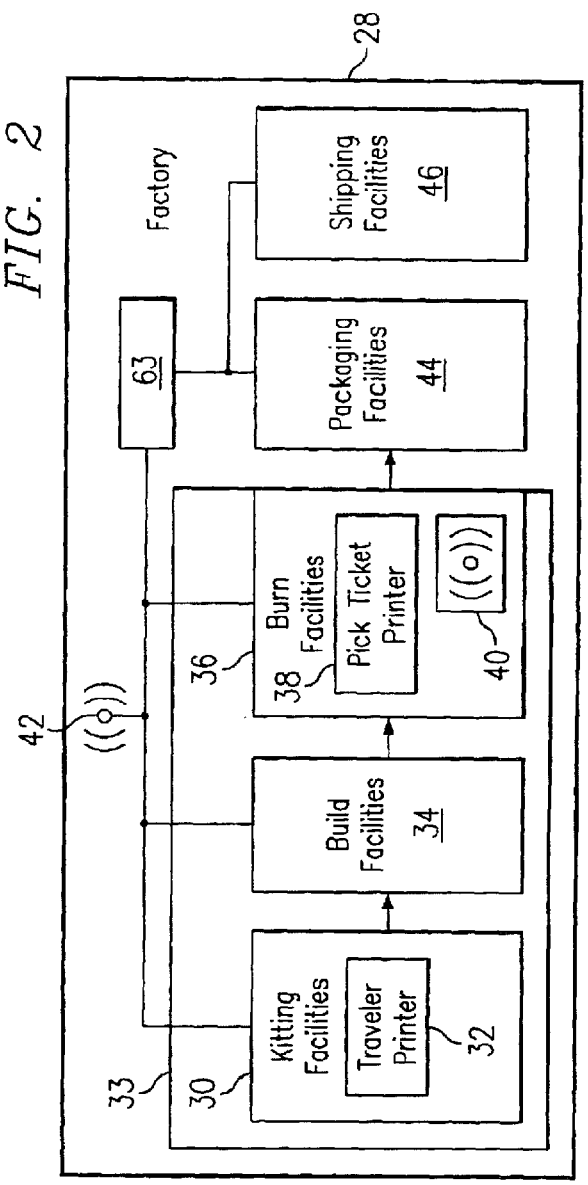
FIG. 2 is a block diagram of an example embodiment of a factory for producing products according to the present disclosure.

Referring now to FIG. 2, there is illustrated a high-level block diagram of an example factory 28 for manufacturing products according to the present invention. In the example embodiment, factory 28 is used to manufacture information handling systems, such as personal computers, servers, routers, or any other instrumentality or aggregate of instrumentalities primarily designed to compute, classify, process, transmit, receive, retrieve, originate, switch, store, display, manifest, detect, record, reproduce, handle or utilize any form of information, intelligence or data for business, scientific, control or other purposes. Each information handling system is individually identified in factory 28 with a unique identifier, such as a serial number, a service tag number, or a tracking code.

Factory 28 includes pre-packaging facilities 33, packaging facilities 44, and shipping facilities 46. The products are built and tested in the pre-packaging facilities 33. In addition, as described below, rather than accumulating completed systems after those systems have been packaged, factory 28 accumulates completed systems in pre-packaging facilities 33.

Figures 3, 5:
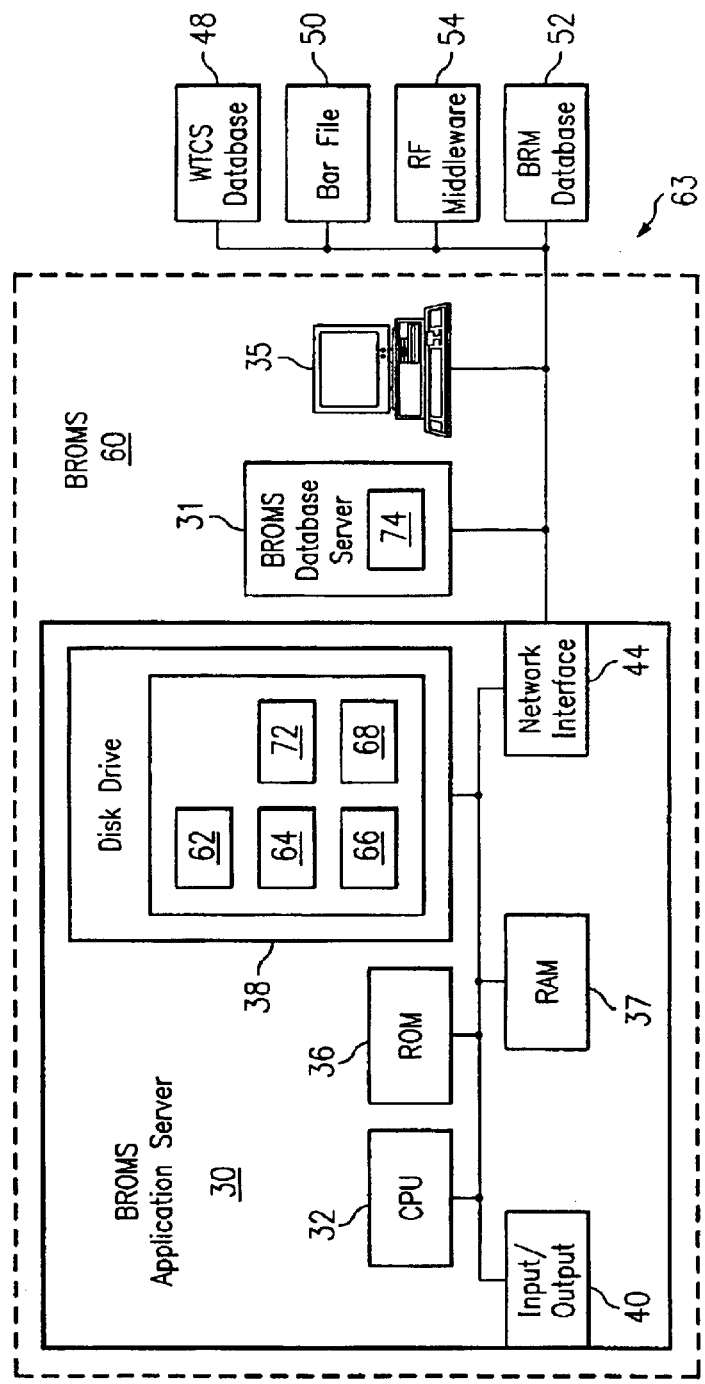
FIG. 3 is a block diagram depicting an example order management system and related systems for the factory depicted in FIG. 2.
FIG. 5 presents an example pick report.

Specifically, referring now also to FIG. 3, an order management system 60 tracks order status and releases accumulated products from pre-packaging facilities 33 for transport to packaging facilities 44 after all of the systems for a particular order have been completed. Order management system 60 may also be referred to as a Burn Rack Order Management System (BROMS) 60. In the example embodiment, BROMS 60 is distributed across and resides primarily on two data processing systems, a BROMS application server 30 and a BROMS database server 31. In addition, one or more additional data processing systems (e.g., a BROMS workstation 35) provide for user interaction with BROMS 60, for example via a Web browser program.

In the example embodiment, the hardware in each of those data processing systems includes one or more CPUs 32, random access memory (RAM) 37, ROM 36, input and output adapters 41, a network interface 44, and one or more system buses interconnecting the above components. Input and output adapters 41 receive data from input devices such as a keyboard and a pointing device and provide output via devices such as video displays.

As described below, BROMS 60 includes various components for providing advantageous functionality, such as product release logic 62, status report logic 64, product hold logic 66, and location report logic 68. In the example embodiment, those components are implemented as software which generally resides on disk drives and is loaded into RAM for execution by CPUs as necessary to manage various operations in factory 28. For example, as illustrated in FIG. 3, disk drive 38 in BROMS application server 30 contains the software components for product release logic 62, status report logic 64, product hold logic 66, and location report logic 68. Similarly, a disk drive in BROMS database server contains a product completion database 74, which stores information such as order numbers, the quantity of products required for each order number, a unique identifier for each product being manufactured, etc.

Each data processing system in BROMS 60 communicates with various other systems or subsystems through network interfaces, such as network interface 44. For example, BROMS 60 receives product location information from a Work-in-process Tracking Control System (WTCS) database 48, product component and configuration information from a bar file 50, product-completion status information from a Burn Rack Monitor (BRM) database 52, and product location information from a wireless input device 40 (shown in FIG. 2), via an antenna 42 and RF middleware 54. The various components described above may be referred to collectively as a manufacturing management system 63.

Figure 4:
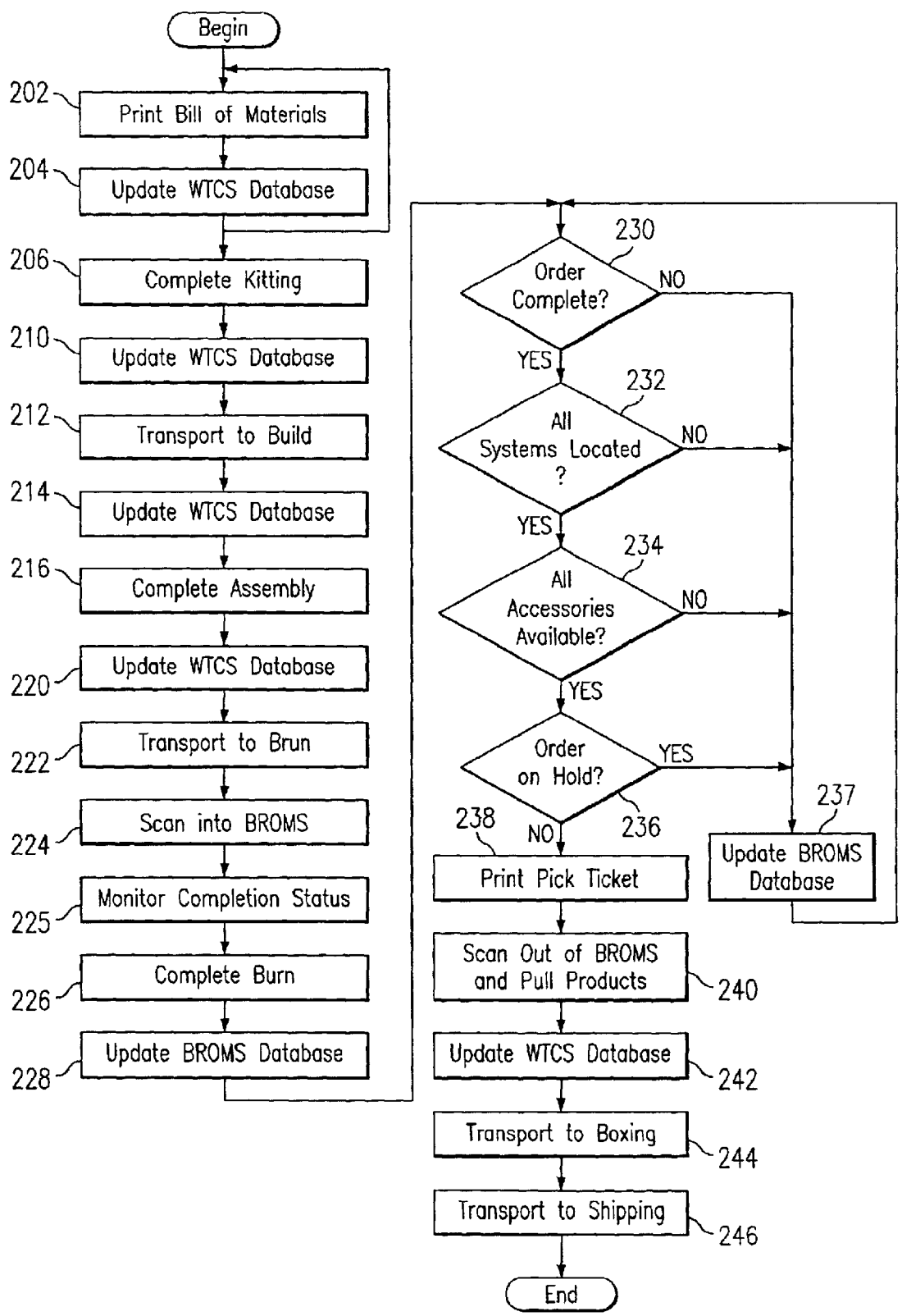
FIG. 4 presents a flowchart of an example process for releasing goods for transport to packaging facilities.

With reference now to FIG. 4, in operation, product assembly begins in factory 28 with manufacturing management system 63 printing of a bill of materials for a particular product for a particular customer order, as illustrated at block 202. The bill of materials, which may also be referred to as a traveler, prints on a traveler printer 32 in kitting facilities 30. Manufacturing management system 63 then updates WTCS database 48 to indicate that the particular product has been released for assembly, as indicated at block 204. As indicated by the arrow returning to block 202 from block 204, additional travelers may then be printed for additional products, even though operations such as kitting, assembly, etc. may not have been completed yet for the first product.

After the traveler prints, components needed to assemble the product according to the customer order are collected into a kit, as depicted at block 206. As shown at block 210, after the kit of components is complete, WTCS database 48 is updated again. Then, the kit is transported to build facilities 34, and WTCS database 48 is again updated to reflect the new location of the kit, as indicated at blocks 212 and 214. The product is then assembled, as depicted at block 216. WTCS database 48 is then updated with the new product status, as depicted at block 220. As shown at block 222, the assembled product is then transported to testing/burn facilities 36.

A worker in testing/burn facilities 36 then uses a wireless input device 40 to scan the product into BROMS 60. For example, wireless input device 40 may be a barcode scanner that uses radio frequency (RF) transmissions to communicate with antenna 42, and BROMS 60 may receive the data from wireless input device 40 via antenna 42 and RF middleware 54. After the product is scanned into BROMS 60, software may be loaded onto the product in accordance with the customer order, and BROMS 60 then monitors the performance of tests executed on the product, as indicated at block 225. As shown at block 226, when the software installation and testing procedures (i.e. the burn process) is completed, BROMS 60 automatically updates product completion database 74 accordingly, as indicated at blocks 226 and 228.

As shown at block 230, BROMS 60 then automatically determines whether the order is now complete. For example, BROMS 60 may determine that the order is complete if the product that just completed the burn process was the final product required to fill a customer order. If the order is not complete, the product release process ends without releasing any products. Instead, BROMS 60 updates BROMS database 74 to show that the order did not meet the release criteria, as indicated at block 237, and BROMS 60 then periodically re-checks the order status, as indicated by the arrow returning to block 230.

However, if the order is complete, BROMS 60 next determines whether all of the products for the complete order are in a known location, as shown at block 232. For example, BROMS 60 may test to determine whether all of the systems are in testing/burn facilities 36. If the location of all systems is not known, BROMS database 74 is updated and the process returns to block 230 without releasing any products, as described above.

Otherwise, BROMS 60 determines whether all accessories for the order are available, as shown at block 234. For instance, in addition to computer systems, the order may call for pointing devices, monitors, or other accessories, and BROMS 60 may query WTCS database 48 to determine whether all of the required accessories are available. If all of the accessories are not available, BROMS database 74 is updated and the process returns to block 230 without releasing any products, as described above. Otherwise, as shown at block 236, BROMS 60 determines whether the order has been placed on hold.

For example, product hold logic 66 in BROMS 60 supports numerous different types of hold requests which provide for more efficient operation of factory 28. For instance, a factory manager may place a hold on a specific product by providing a unique identifier such as a service tag number or serial number for that product. Similarly, the factory manager may place all products for a particular order on hold by specifying the appropriate order number. BROMS 60 would then automatically identify the products involved in that order and prevent those products from being released from testing/burn facilities 36, even though all products required for that order may be complete. The plant operator may also place products on hold by specifying a particular component to be held, and BROMS 60 would then automatically identify all products that contain the specified component, to prevent those products from being released to packaging. Also, the product manager can specify a product model to be held. For example, the manager may place a hold on all products with the model specification Poweredge 1500. BROMS 60 would then automatically prevent all products having that model from being released to packaging. A product may also be held in response to cancellation of a customer order or a stop shipment request being placed on a customer order.

If any of the products for the order are on hold, BROMS database 74 is updated and the process returns to block 230 without releasing any products, as described above. Otherwise, the process passes from block 236 to block 238, and BROMS 60 releases the order for transport to packaging facilities 44 by printing one or more pick reports which identify the specific products to be retrieved from testing/burn facilities 36. The pick reports may also be known as pick tickets, and the pick tickets are printed on a pick ticket printer 38 within testing/burn facilities 36.

Referring now to FIG. 5, an example pick ticket includes four unit identifiers which specify the products to be retrieved, and four respective unit locations which specify the locations within testing/burn facilities 36 where the specified products can be found. Specifically, in the example embodiment, testing/burn facilities 36 include numerous burn racks which accommodate the products that are receiving software and being tested. The burn racks provide a matrix of slots arranged in rows and columns, and various subsets of columns may be referred to as aisles. The unit locations in the pick ticket of FIG. 5 identify the slots within the burn racks which contain the products to be retrieved for transport to packaging facilities 44. By providing pick reports that specify precisely which products need to be retrieved for transport to packaging facilities 44 and precisely which locations contain those products, BROMS reduces the amount of labor required, compared to factories in which workers look for completed systems to retrieve without explicit directions.

If a customer order includes more than four products, multiple pick tickets will be printed in sequence, so that the whole order is released for transport to packaging at substantially the same time. Thus, unlike in prior factories, in factory 28 products are transported from the pre-packaging facilities to the packaging facilities on the basis of completed orders, rather than on the basis of completed systems. BROMS is also provided with a pause button, which may be pressed to temporarily stop all pick tickets from being printed.

With reference to block 240 of FIG. 4, after the pick ticket or tickets are printed, workers retrieve the identified products and scan the products out of the BROMS 60. For instance, a worker may scan a barcode on each product that is being retrieved. In addition, the associate manually updates WTCS database 48, and the products are then transported to packaging facilities 44, as indicated at blocks 242 and 244, respectively.

There, the products are packaged in preparation for shipment. For example, a vacuhoist may be used to lift each product into its own box. Accessories for the product may also be placed into the box, and then the box may be sealed. As shown at block 246, the product may then be transported to shipping facilities 46 for shipment with other products in the order to the customer. The process for releasing that specific order then ends. However, BROMS 60 also continues to monitor and process any remaining orders, automatically identifying and processing completed order as those orders reach completion, as described above.

Referring again to block 238, in BROMS 60, product release logic 62 determines when an order will be released from burn facilities 36, as described above. In addition, product release logic 62 optimizes the release process to minimize the amount of labor required to retrieve the products for transport to packaging facilities 44. For instance, in the example factory, the burn racks have four rows, and carts with four rows and the capacity to carry one product in each row are used to transport products from pre-packaging facilities 33 to packaging facilities 44. When printing pick reports, product release logic 62 generally selects four products in four different rows of the burn rack, so that each of those products may be slid from its burn slot to the cart without any manual lifting or lowering. In addition, product release logic 62 provides for a steady flow of products for each order, so that workers in packaging facilities 44 and shipping facilities 46 see the packages for each order in a substantially continuous flow, which allows those workers to do their jobs more efficiently. Additionally, the logic of BROMS can be set to determine how many orders will be released in parallel and what order sizes should be accumulated.

In addition to the control capability described above, BROMS 60 also provides detailed order status monitoring and reporting capabilities. For example, BROMS 60 includes a burn rack utilization monitor 72 that tracks which slots in the burn rack are occupied or vacant and produces reports describing the vacant capacity in the burn racks of testing/burn facilities 36. A production manager may use the reports of vacant capacity to assign priority to different orders, thereby causing burn slots to be made available as necessary for a desired production sequence. For example, the production manager may use the capacity reports to prevent undesirable situations such as deadlock, in which no orders can be completed because no vacant space is available to accommodate products needed to complete pending orders.

Location report logic 68 provides location reports which identify a location for one or more products based on at least one attribute of those products. For example, the product attribute may be a unique identifier for a specific product, an order number involving one or more products, an identifier for a component included in one or more products, or a product model identifier. When an individual inputs one of those kinds of attributes, BROMS 60 automatically determines and displays the location of all corresponding products, such as the location of the specific product, of all products required for a particular order, of all products including a specified component, or of all products with a specified product model.

Status report logic 64 produces status reports which list all orders that are complete or nearly complete. The status reports may be used in packaging facilities 44 to help predict requirements for resources such as packaging material and manpower. The users of the status reports will predict demand for the packaging department, which will allow proper utilization of resources in the packaging area.

Some status reports, known as EMR reports, also cross-reference order-status information from product completion database 74, WTCS database 48, and BRM database 52. Specifically, the EMR reports notify individuals such as production managers about which orders are nearing completion and which of those orders have products in EMR. Furthermore, the reports provide the unique location and unique identifier for each product in EMR. The production manager may then instruct EMR technicians to increase the priority for repairing the specific product or products needed to complete a nearly complete order.

For example the report may show that an order requires one hundred systems, that ninety-nine of those systems have been completed, and that one of the systems failed testing and is in EMR. The production manager could then instruct the EMR technicians to repair the faulty system immediately. The EMR reports therefore allow the production manager to force resolution of problems earlier and parallel to systems under test. For instance, if an order is nearing completion, the manager can increase the priority for repairing specific products in EMR, so that those repairs can be completed by the time any remaining products are built and tested.

In addition, BROMS 60 tracks productivity for each worker in burn facilities 16 (i.e., for each burn associate), keeping track of how many products each burn associate has retrieved for transport to packaging, what kind of system each burn associate has pulled, etc. BROMS 60 also produces productivity reports that document the productivity of each burn associate and indicate whether any burn associate has been "cherry picking," for example by only servicing pick tickets for certain kinds of systems or for systems in certain parts of the burn rack. To facilitate productivity tracking, each wireless input device 40 (also known as a scanner 40) may be checked out to one burn associate, and when the scanners are used to scan products into and out of burn facilities 16, those activities may be attributed to the respective burn associates. Alternatively, the burn associates may wear employee badges, and each burn associate may be required to scan his or her badge, the product track code, and the burn location with scanner 40 when scanning products into burn. When a product completes burn, the associate may then be required to scan his or her badge and the product track code using a different scanner to scan products out of burn, to facilitate a count of systems unloaded from burn.

Figure 6:
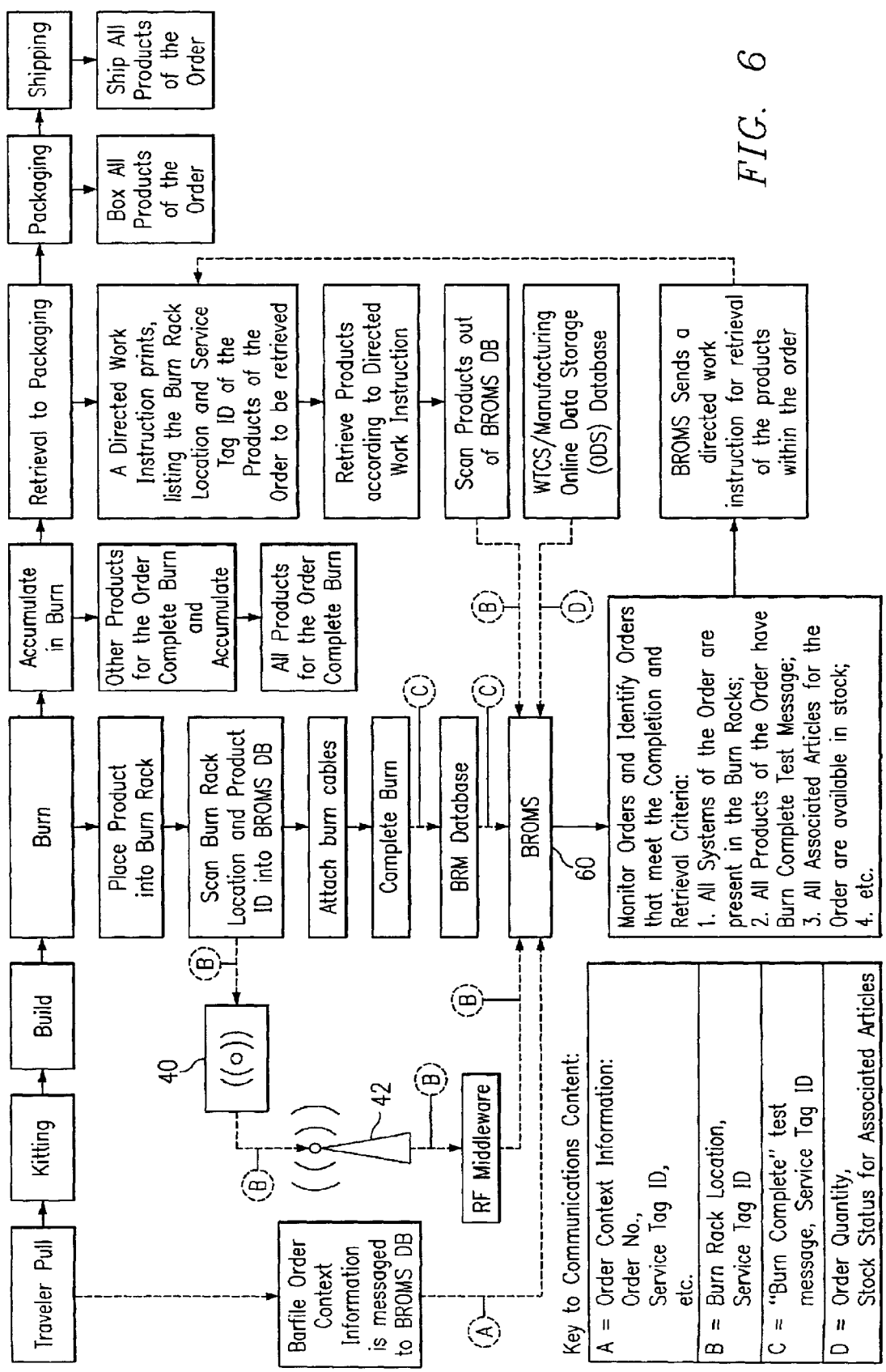
FIG. 6 is a flow diagram for products and information in the factory of FIG. 2.

Referring now to FIG. 6, the flow of components, products, and information within factory 28 is summarized in a flow diagram. The physical flow of components and products through the different areas of factory 28 is represented by the thick arrows at the top of the diagram between the boxes for Traveler Pull, Kitting, Build, and Burn, as well as by the thick arrows between the boxes for Retrieval to Packaging, Packaging, and Shipping. As indicated by the arrows flowing down from the boxes at the top of the diagram for Burn, Accumulate in Burn, and Retrieval to Packaging, many operations must be performed in burn facilities 36 and many conditions must be satisfied before products are released from burn facilities 36 for transport to packaging facilities 44. The dashed lines and associated dashed circles A, B, C, and D summarize the content of the communications or information that passes between the various components of manufacturing management system 63, as further explained in the box labeled "Key to Communications Content."

In conclusion, as will be evident from the above description, factory 28 enjoys numerous advantages, relative to prior factories. For example, less handling of products is required, as products do not have to be parked in an accumulation space after they are boxed, and then moved from the accumulation space to the shipping facilities. Instead, the products may be transported directly from packaging facilities 44 to shipping facilities 46.

Furthermore, packaged products typically occupy more space than unpackaged products. In prior factories, however, products are typically accumulated (e.g., on pallets or in an automated storage and retrieval system (ASRS)) after they have been packaged. By contrast, factory 28 accumulates products before they are packaged. This approach is therefore more space efficient and/or less costly than approaches used in prior factories.

Moreover, by closely tracking product locations throughout the assembling, testing, and accumulation operations, BROMS 60 makes it easier to place holds on products, based on a variety of different criteria, and to locate specific products. By contrast, prior systems which tracked product location less closely required workers to manually examine bills of materials for numerous systems to identify particular systems of interest, such as systems including a specified component or products for a specified order.

For example, to monitor product quality, a manufacturer may desire to test random systems subsequent to the standard testing/burn operations. Such a quality assurance test may be referred to as an out of box experience (OBE). Whereas prior factories required boxes to be unsealed and opened so that post-completion testing could be performed, BROMS 60 allows products to be located in the pre-packaging facilities and tested before they are boxed.

Although the present invention has been described with reference to an example embodiment, those with ordinary skill in the art will understand that numerous variations of the example embodiment could be practiced without departing from the scope and spirit of the present invention. For example, a number of determinations are described above as being made by manufacturing management system 63. As will be evident to those of ordinary skill in the art, most or all of those determinations are made automatically and with reference to databases that reflect the current state of the production environment. Most or all of those databases are preferably within manufacturing management system 63, but some may alternatively be maintained externally.

Also, the modules and components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. In alternative embodiments, data processing systems incorporating the invention may include personal computers, mini computers, mainframe computers, distributed computing systems, and other suitable devices. Additionally, in alternative embodiments, some of the components of the order management system could reside on different data processing systems, or all of the components could reside on the same hardware.

Alternative embodiments of the invention also include computer-usable media encoding logic such as computer instructions for performing the operations of the invention. Such computer-usable media may include, without limitation, storage media such as floppy disks, hard disks, CD-ROMs, read-only memory, and random access memory; as well as communications media such wires, optical fibers, microwaves, radio waves, and other electromagnetic and/or optical carriers. The control logic may also be referred to as a program product.

Many other aspects of the example embodiment may also be changed in alternative embodiments without departing from the scope and spirit of the invention. The scope of the invention is therefore not limited to the particulars of the illustrated embodiments or implementations but is defined by the appended claims.

What is claimed is:

1. A factory for manufacturing customized products in response to customer orders, the factory comprising:
    pre-packaging facilities in which components are converted into completed products;
    packaging facilities in which the completed products are packaged;
    an order management system that associates individually identified products among the completed products with a customer order; and
    product release logic in the order management system that accumulates the individually identified products in the pre-packaging facilities and releases the individually identified products for transport from the pre-packaging facilities to the packaging facilities only after determining that substantially all of the individually identified products for the customer order have been completed.

2. The factory of claim 1, wherein:
    the product release logic in the order management system releases the individually identified products for transport to the packaging facilities only after determining that one hundred percent of the individually identified products for the customer order have been completed.

3. The factory of claim 1, wherein the order management system releases the individually identified products for transport to the packaging facilities by producing one or more pick reports that identify the individually identified products to be released.

4. The factory of claim 1, wherein:
    the pre-packaging facilities comprises testing facilities; and
    the product release logic causes the individually identified products for the customer order to accumulate in the testing facilities until substantially all of the individually identified products have tested good.

5. The factory of claim 4, wherein the order management system further comprises:
    status report logic that produces a status report indicating whether the customer order is nearing completion, such that a high repair priority may be assigned to any individually identified products for the customer order that tested bad.

6. The factory of claim 1, wherein the order management system further comprises:
    product hold logic that receives a hold order and, in response:
    automatically determines whether any of the individually identified products are subject to the hold order; and
    automatically prevents any individually identified products subject to the hold order from being released.

7. The factory of claim 1, wherein:
    the pre-packaging facilities are used to assemble multiple sets of products for multiple customer orders; and
    the order management system further comprises location report logic that produces a location report identifying a location for at least one product among the multiple sets of products, based on at least one product attribute.

8. The factory of claim 7, wherein:
    the at least one product attribute comprises a unique identifier for a specific product among the multiple sets of products; and
    the location report identifies a specific location for the specific product.

9. The factory of claim 7, wherein:
    the at least one product attribute comprises an order number for a specific order among the multiple customer orders; and
    the location report identifies which of the products for the specific order are located in at least one testing facility associated with the pre-packaging facilities.

10. The factory of claim 7, wherein:
    the at least one product attribute comprises a component of one or more products among the multiple sets of products; and
    the location report identifies specific locations for the one or more products that include the component.

11. The factory of claim 7, wherein:

the at least one product attribute comprises a product model; and the location report identifies specific locations for the products that include the component.

12. The factory of claim 1, wherein the order management system further comprises:

status report logic that produces a status report identifying how many products are in the customer order and how many of those products have been completed, such that the report may be used to predict demand for resources in the packaging facilities.

13. The factory of claim 1, wherein:

the pre-packaging facilities comprise assembling facilities and testing facilities;

the completed products comprise information handling systems that have been assembled in the assembling facilities and tested in the testing facilities;

the packaging facilities comprise boxing facilities in which the completed information handling system are boxed; and the product release logic in the order management system accumulates the information handling systems in the testing facilities and releases the information handling systems for the customer order for transport from the testing facilities to the boxing facilities only after determining that substantially all of the information handling systems for the customer order have been assembled and have tested good.

14. A method of manufacturing customized products in response to customer orders in a factory that includes pre-packaging facilities and packaging facilities, the method comprising:

assembling components in the pre-packaging facilities into multiple products for a customer order, wherein each of the multiple products is uniquely identified and assigned to the customer order;

accumulating the multiple products in the pre-packaging facilities; and releasing the multiple products for transport from the pre-packaging facilities to the packaging facilities only after determining that substantially all of the multiple products for the customer order have been completed.

15. The method of claim 14, wherein releasing the multiple products further comprises:

producing one or more pick reports that identify the multiple products to be released.

16. The method of claim 15, further comprising:

retrieving the multiple products to be released from the pre-packaging facilities for transport to the packaging facilities, based on the one or more pick reports, wherein two or more individuals retrieve the multiple products; and producing a productivity report that identifies how many products have been retrieved by each of the two or more individuals.

17. The method of claim 14, wherein the pre-packaging facilities include testing facilities, the method further comprising:

testing one or more of the multiple products for the customer order in the testing facilities;

producing a status report that identifies how many products in the customer order have been completed;

determining that the customer order is nearing completion, based on the status report;

identifying a product in the customer order that failed testing, in response to the determination that the customer order is nearing completion; and assigning a high repair priority to the product that failed testing.

18. The method of claim 14, further comprising:

receiving a hold order;

determining that one or more of the multiple products for the customer order are subject to the hold order; and automatically preventing the products subject to the hold order from being released.

19. The method of claim 14, further comprising:

assembling multiple sets of products for multiple customer orders; and producing a location report that identifies a location for at least one product among the multiple sets of products, based on at least one product attribute.

20. The method of claim 14, wherein the pre-packaging facilities include testing facilities, the method further comprising:

producing a report of vacant capacity for products in the testing facilities.

21. A program product for managing a factory in which customized products are built in response to customer orders, wherein the factory includes testing facilities and packaging facilities, the program product comprising:

a computer-usable medium; and computer instructions encoded in the computer-usable medium, wherein, when executed, the computer instructions perform operations comprising:

associating a set of products with a customer order, such that each of the products in the set is uniquely identified and assigned to the customer order;

monitoring test status for the set of products;

accumulating the set of products for the customer order in the testing facilities;

automatically determining whether substantially all of the products in the set have been completed, based on the test status; and automatically releasing the set of products for transport from the testing facilities to the packaging facilities only after determining that substantially all of the products for the customer order have been completed, such that the program product causes one or more of the products in the set to accumulate in the testing facility after the one or more products in the set have tested good.

* * * * *